(12) United States Patent
Sörquist

(10) Patent No.: US 7,832,753 B2
(45) Date of Patent: Nov. 16, 2010

(54) GEAR SHIFT BAR AT A WHEEL FOR A VEHICLE

(75) Inventor: Christofer Sörquist, Ulricehamn (SE)

(73) Assignee: Gearwheel AB, Jönköping (SE)

( * ) Notice: Subject to any disclaimer, the term of this patent is extended or adjusted under 35 U.S.C. 154(b) by 150 days.

(21) Appl. No.: 12/305,184

(22) PCT Filed: May 30, 2007

(86) PCT No.: PCT/SE2007/050375

§ 371 (c)(1),
(2), (4) Date: Dec. 16, 2008

(87) PCT Pub. No.: WO2007/145581

PCT Pub. Date: Dec. 21, 2007

(65) Prior Publication Data

US 2009/0166995 A1 Jul. 2, 2009

(30) Foreign Application Priority Data

Jun. 16, 2006 (SE) .................................... 0601393

(51) Int. Cl.
*A61G 5/10* (2006.01)
(52) U.S. Cl. .................. 280/304.1; 280/250.1; 280/285; 280/286; 280/246; 280/255; 192/217.4
(58) Field of Classification Search ............. 280/250.1, 280/285, 286, 304.1, 246, 255; 192/217.4
See application file for complete search history.

(56) References Cited

U.S. PATENT DOCUMENTS 3,563,568 A * 2/1971 Sasse et al. .................. 280/230
4,506,901 A    3/1985 Tosti (Continued)

FOREIGN PATENT DOCUMENTS

| DE | 19930973 A1 | 2/2001 |
|---|---|---|
| DE | 10 2005 003 056 A1 | 7/2006 |
| FR | 2 588 513 A1 | 4/1987 |
| WO | WO-99/17980 A1 | 4/1999 |
| WO | WO 2004/084787 A1 | 10/2004 |
| WO | WO 2006/062643 A2 | 6/2006 |

OTHER PUBLICATIONS

Supplementary European Search Report, dated Aug. 28, 2009, issued in connection with counterpart European Application No. 07 74 8536.
PCT/ISA/210—International Search Report—Sep. 17, 2007.
PCT/ISA/237—Written Opinion of the International Searching Authority—Sep. 17, 2007.

*Primary Examiner*—Lesley Morris
*Assistant Examiner*—Tashiana Adams
(74) *Attorney, Agent, or Firm*—Venable LLP; Eric J. Franklin

(57) ABSTRACT

A gear shift pertaining to a hub of a wheel with a quick lock. The hub has a gear which is supported round a shaft with an outer end and an inner end. The inner end of the shaft is suspended via a suspension device on a vehicle. The quick lock includes a rod which runs in a cylindrical hole which is concentric within and with the shaft and a catch which locks the wheel with the shaft to the suspension device. The gear shift includes the shaft, the rod and a control, all so adapted that the rod has a neutral position relative to the shaft and wherein a movement, relative to the shaft, of the rod from the neutral position in a direction from the outer end of the shaft towards the inner end of the shaft disengages the catch so that the wheel together with the shaft can be locked to and released from the suspension device. The rod is further provided with a gear selector contact configured to contact a gear selector in the gear, and, by a movement, relative to the shaft, of the rod in an axial direction from the neutral position in a direction from the inner end of the shaft to the outer end of the shaft, acts via the gear selector contact to cause the gear selector in the gear to change gear position so that the gear ratio of the wheel relative to a drive device for the wheel is changed.

19 Claims, 4 Drawing Sheets

U.S. PATENT DOCUMENTS

| | | | |
|---|---|---|---|
| 4,679,862 A * | 7/1987 | Luo | 301/112 |
| 4,727,965 A * | 3/1988 | Zach et al. | 192/217.4 |
| 5,037,120 A | 8/1991 | Parisi | |
| 5,160,156 A | 11/1992 | Mendon | |
| 5,322,312 A | 6/1994 | Cammack | |
| 5,362,081 A * | 11/1994 | Beidler et al. | 280/250.1 |
| 5,482,305 A * | 1/1996 | Jeffries et al. | 280/250.1 |
| 5,486,016 A | 1/1996 | Godin et al. | |
| 5,727,850 A * | 3/1998 | Masclet | 301/111.03 |
| 5,941,547 A | 8/1999 | Drake | |
| 6,203,041 B1 | 3/2001 | Helm | |
| 6,805,371 B2 * | 10/2004 | Meginniss et al. | 280/250.1 |
| 7,520,519 B2 * | 4/2009 | Smurthwaite | 280/250.1 |
| 2005/0067807 A1 * | 3/2005 | Harcourt et al. | 280/246 |
| 2008/0252036 A1 * | 10/2008 | Smurthwaite | 280/250.1 |

* cited by examiner

GEAR SHIFT BAR AT A WHEEL FOR A VEHICLE

CROSS-REFERENCE TO RELATED APPLICATIONS

This application claims priority to Swedish patent application 0601393-2 filed 16 Jun. 2006 and is the national phase under 35 U.S.C. §371 of PCT/SE2007/050375 filed 30 May 2007.

TECHNICAL FIELD

The present invention relates to a gear shift pertaining to a hub of a wheel with a quick locking function. The invention relates in particular to such a gear shift pertaining to a wheel with a gear hub for a wheelchair.

STATE OF THE ART

It is now very usual for wheels of the cycle wheel type or wheels for wheelchairs to be provided with a gear to increase the usability of a cycle or wheelchair on varying gradients.

What is specifically concerned here are wheels intended for use on manually powered wheelchairs, but there is nothing to prevent said wheels being used for other types of vehicles of the cycle type.

Users' success in using a wheelchair and doing so independently depends greatly on their ability to power it themselves. Whereas some individuals with manual wheelchairs have access to staff who will push the wheelchair, it is usually desirable for users themselves to be able to propel it.

Manual wheelchairs are propelled, steered and braked by users by either turning or gripping a ring attached to each wheel of the wheelchair.

Each gripping ring is structurally connected to the respective wheel of the wheelchair, the latter being in contact with the running surface. Users usually have to exert a relatively large force to effect many of the operations involved in using a conventional wheelchair, by acting upon the gripping rings on either side of the wheelchair. These operations may result in various kinds of acute and chronic arm and shoulder damage. Other problems include elbow, wrist and hand damage caused by repetitive stress on these parts of the body. Users' hands may also sustain wear-and-tear damage due to abrasion and friction between hands and gripping rings.

Various environmental factors may accelerate or even cause said damage, e.g. rough ground or uneven surfaces on which the wheelchair travels. Using a wheelchair in rain or on snow or ice or with cold or slippery hands may also cause damage. In many cases, the occurrence of such damage may be a contributory factor in otherwise healthy users being compelled to change to a powered wheelchair or needing assistance to move their wheelchair. Wheelchair users do not usually want assistance, as they prize their independence highly and helping them is a drain on the community's already sparse available resources.

A number of steps have already been taken in the past to improve the performance of manual wheelchairs and make their use less burdensome for users. Such improvements include two-speed wheelchairs of the kind referred to inter alia in U.S. Pat. No. 5,482,305 and U.S. Pat. No. 5,160,156. Various drive mechanisms are also known, including propulsion systems in the form of crank mechanisms operated by the arms, referred to in U.S. Pat. Nos. 5,037,120 and 4,506,901 which describe cranks and gears which are similar to those used on cycles, are fitted in front of the operator and are turned by the latter by hand to power and brake the wheelchair. Other systems use a centrally positioned planetary gear, as in the devices proposed in U.S. Pat. Nos. 5,486,016 and 5,362,081. An advantage of using gearing between, for example, a gripping ring and a wheel is that it enables the user to reduce the number of gripping ring actions required for travelling a given distance. Powering by lever devices is also known, e.g. from specifications U.S. Pat. Nos. 5,941,547 and 5,322,312. There has also been recently a development of wheels for manual wheelchairs, known as wheels with electrical back-up, but the resulting embodiments and characteristics suffer from a number of disadvantages. As well as being expensive, they are also inconvenient and add extra weight to the wheelchair while at the same time being difficult to install on existing wheelchairs.

One requirement for a wheelchair to be user-friendly is that the wheels need to be easy to remove, making it considerably easier for the wheelchair user to travel by other kinds of vehicles, such as cars, buses and trains, since the wheels can be taken off so that the wheelchair occupies less space and can be carried with the user.

For these reasons, a quick lock function has been developed for wheels on manually powered wheelchairs. Such a quick lock function is known from the previously mentioned U.S. Pat. No. 5,482,305, in which the wheelchair has a planetary gear in the wheel hub and is provided with mechanisms for choice of gear ratio between gripping ring and wheels to make it easier for the wheelchair to negotiate gradients. The quick lock function comprises a rod which runs within the wheelshaft and which when moved in an axial direction inwards towards the wheelchair acts upon a lock so that the wheel and hub are disconnected from the wheelshaft.

As previously mentioned, planetary gears are already used in wheels of wheelchairs in the same way as their very common use in cycle wheels. Change of gear position on a cycle with a planetary gear in the hub of its powered wheel is usually performed by means of a chain disposed relative to the hub shaft. The chain runs via one end of the shaft about which the wheel is supported and in through a hole along this shaft's centreline, so that the chain can act upon a gear selector for the planetary gear within the hub. To make it possible to operate the chain, it is typically fastened to one end of a wire which has its other end fitted to a gear selection positioner. The positioner is of course situated within as convenient a reach as possible for the cycle rider, such as near the fingers or hands, e.g. on the handlebar, so that the rider does not even need to change the position of a hand in order to change gear. There are similar devices for setting the gear position of a wheelchair wheel planetary gear whereby a wire or equivalent pulls a chain which acts upon the gear selector in the planetary gear.

A disadvantage which arises in arranging gearchange devices for a wheelchair wheel for operating the planetary gear via a wire or other mechanism connected to the outer end of the wheelshaft is that the previously mentioned quick lock function imposes stringent requirements upon the designer if the wheel is to maintain its function of being easy and quick to remove from the wheelchair. Any wires, chains or similar devices which remain dangling from the wheel hub when the wheel is detached from the wheelshaft are in principle unacceptable.

The last-mentioned specification U.S. Pat. No. 5,482,305 refers to a mechanism which does not use a chain at the wheelshaft for setting the gear position of the planetary gear. Instead, it uses a finger disc which is disposed on the hub outside the gripping ring and is in contact with the planetary gear via a sleeve disposed all round the previously mentioned rod for operating the quick wheel lock. A disadvantage of this finger disc is that changing gear entails its being rotated rearwards or forwards and being situated close to the wheel hub on the outer side of the wheel. To change gear, the user has to let go of the gripping ring and find the finger disc. This is inappropriate, for example, when the wheelchair is on a sloping running surface. Another difficulty of this known technology is that it is very difficult to incorporate more than two alternative gear positions. The user is obliged to impart his/her desired gear ratio to each wheel separately, since there is no synchronisation between the gear ratios of the respective wheels.

An object of the present invention is to provide a device and a method which represent a gearchange function improvement relative to the state of the art.

DESCRIPTION OF THE INVENTION

One aspect of the invention presents a device. A second aspect of the invention presents a method for gear position setting when using the device.

The gear shift according to the patent is intended to be used in relation to a wheel which has gearing via a gear between the wheel and a drive mechanism for the wheel, the drive mechanism in the case of a wheelchair wheel usually taking the form of a gripping ring. The gear shift is also used on a vehicle with a wheel which has a quick lock function for quick manual fitting/removal of the wheel to/from the vehicle, i.e. without needing to use tools. The vehicle concerned preferably takes the form of a wheelchair, but the device may equally well be used on, for example, a cycle with a cyclewheel shaft which is only fastened to the cycle at one end of the shaft.

The gear shift comprises:
a gear positioner situated where it is easy for the user to reach, in particular near to his/her fingers,
a rod in the wheelshaft which when moved in an axial direction outwards from the shaft's fastening in the vehicle causes a gear selector in the gear to change the gear position, and
a pull or push control, hereinafter simply called control, for transmitting a chosen gear position of the positioner to said rod.

A unique feature according to an aspect of the invention is that the same rod which, when moved in an axial direction, acts upon the gearchange mechanism also serves as the device used for disconnecting the quick lock function for the wheel when the rod is moved in the opposite direction.

A great advantage of the device according to the present invention is that it is possible to maintain the possibility of quickly locking the wheel to the vehicle, e.g. the wheelchair, according to the state of the art and to have access to a gearchange mechanism which is connected to the wheel on an opposite side of the wheel from that where the quick lock is operated. This arrangement makes it possible to quickly release the wheel from the vehicle without the wheel being encumbered with, for example, a wire or a pull rod, for operating a gear in the wheel, which would significantly hinder the operation of quickly freeing the wheel from the vehicle.

The wheel hub is preferably provided with a planetary gear. With the arrangement referred to according to the invention, such a planetary gear is provided with two, three, four or more gear positions, since the number of gear positions does not render the configuration of the gearchange mechanism according to the invention more difficult. As the function of a planetary gear is known, it is not described in more detail here. It should merely be mentioned here that the planetary gear includes a gear selector, i.e. the part of the planetary gear which has to be manipulated to effect a change of gear position, i.e. by the gear selector being moved in an axial direction by an arm, guide spigot or guide pin etc.

The planetary gear is supported about a stationary shaft in the centre of the hub. The shaft's configuration differs substantially from existing shafts for planetary gears. As previously mentioned, current practice is to use a pulling force via a wire which runs in a cavity along the shaft centreline to cause the gear selector to change the gear position. This wire runs, without known exceptions, from the shaft at the same end of it as that where the pulling force applied is delivered to the hub, i.e. wheelchairs have their gripping ring situated on the same side of the wheel as the wire and chain, and cycles have a driving chain with the drive disposed on the same side of the wheel as the wire and chain for the gearchange mechanism. The fact that the gearchange and the quick lock are operated from opposite sides of the shaft to the wheel means that the wheelshaft according to the invention is substantially reconfigured relative to corresponding shafts according to the state of the art.

The wheelshaft is connected to an adapter which is firmly fixed to the vehicle, i.e. the wheelchair or the cycle. A central element of the invention is said rod, which makes it possible, from a direction opposite to the usual one, to act upon the gear position by exerting a pushing force on the rod instead of by exerting a pulling force imparted via a chain or wire. A springback mechanism in the structure of the planetary gear causes said rod to spring back to an original position if the pushing force exerted on the rod ceases.

The choice of gear position is controlled by the gear positioner, which in the case of wheelchair is situated within easy reach on the wheelchair frame. The gear positioner transmits the gear positions set by the user via a control which may take the form of a wire (or other elongate flexible means) or a link system to the rod which controls the gear selector in the planetary gear. A wheelchair is usually provided with two wheels driven by gripping rings. Preferably, both wheels are equipped with the gearchange mechanism according to the invention, in which case it is advantageous that the gear positioner should act on planetary gears in both wheels in order to set the same gear position for both wheels.

The gear shift according to the invention makes it possible to use on wheelchairs a product development with no wires or links situated outside the wheel. Wires or links used as part of the control for the gear shift can be firmly anchored in the wheelchair and therefore need no handling by a user when dismantling the wheel. A further great advantage is that the device according to the invention makes it possible to fit existing wheelchairs with quick locks.

As previously mentioned, the operating rod, in this description called simply the rod, has two purposes, one being to serve as initiator for engagement and disengagement of the locking of the wheel to the shaft, the other to serve as one of the gear shift's components which actively set the gear position in the gear in the wheel hub.

Further features of the present invention are indicated in the following detailed description, which is to be interpreted in conjunction with the attached drawings. It should be emphasised that the sole purpose of the drawings is to illustrate and they are not intended to limit the invention in any way. The drawings are not to scale and merely illustrate conceptual structures and procedures herein described.

BRIEF DESCRIPTION OF THE DRAWINGS

FIG. 5a depicts in perspective view an example of an embodiment of the rod according to FIG. 3, but without springs, whereas

DESCRIPTION OF EMBODIMENTS

Figure 1:
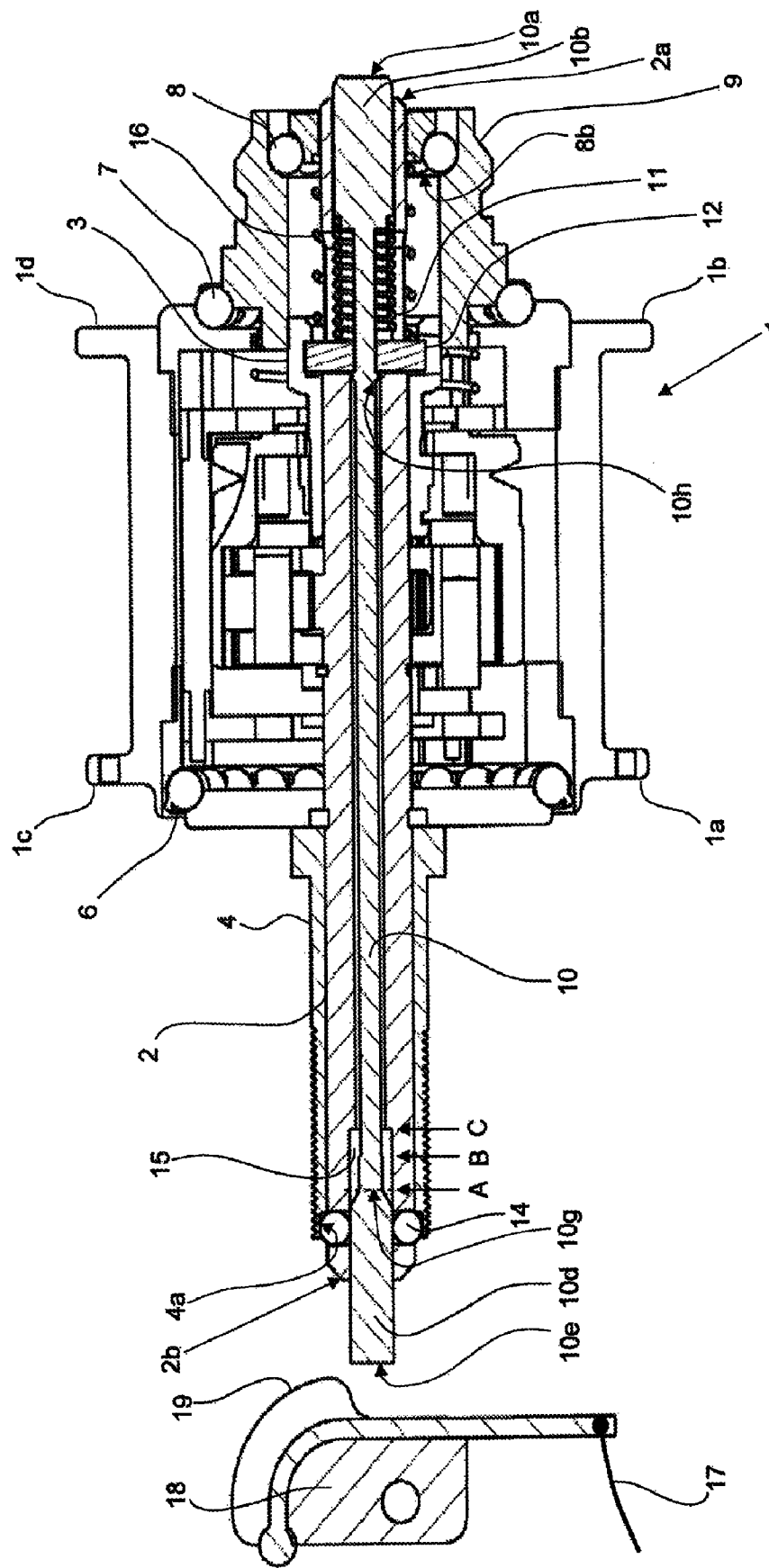
FIG. 1 depicts an axial cross-section of a hub with a shaft and gearchange mechanisms according to an aspect of the invention.
Figure 2:
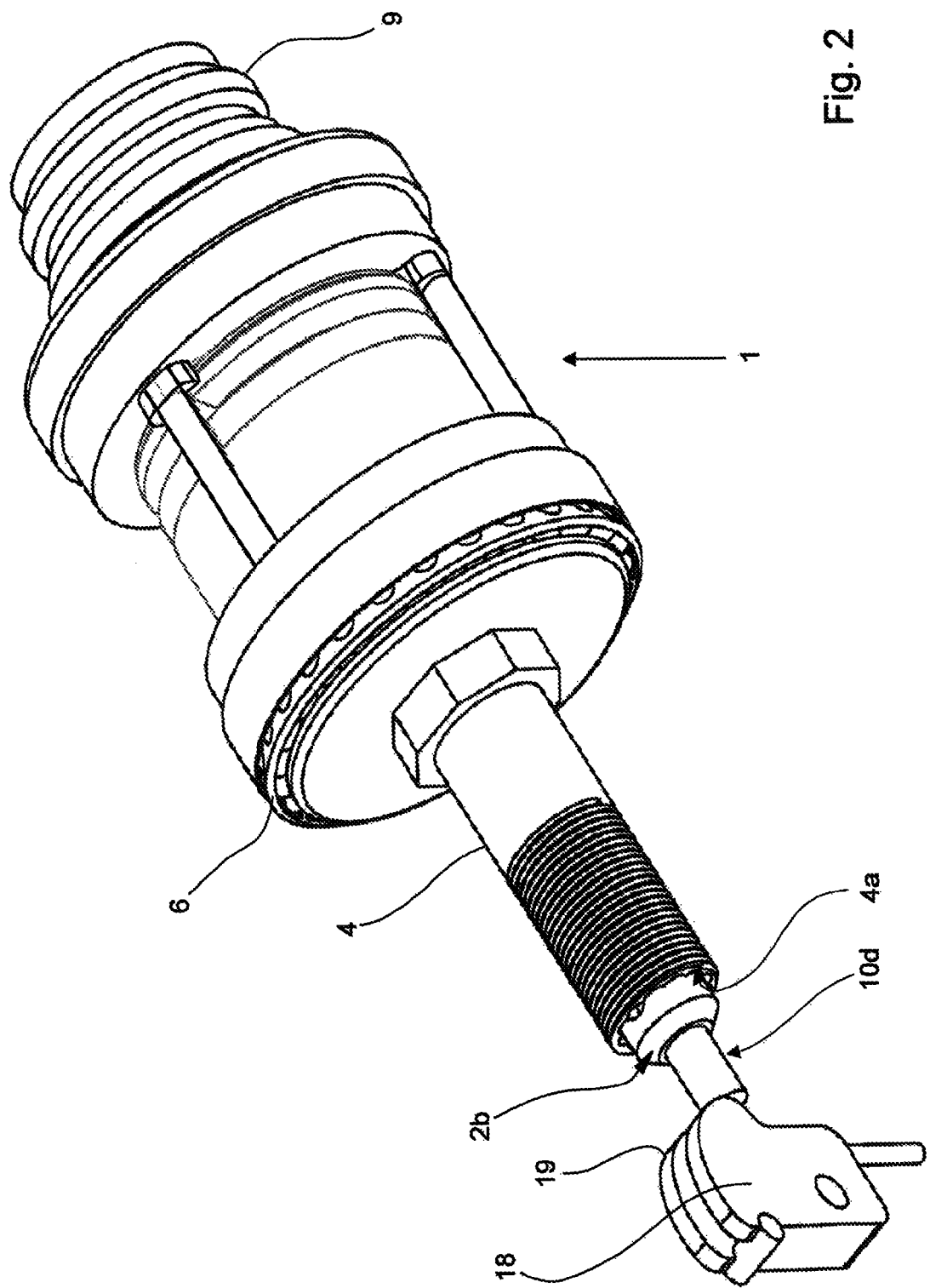
FIG. 2 illustrates a perspective view of the hub according to FIG. 1.
Figure 3:
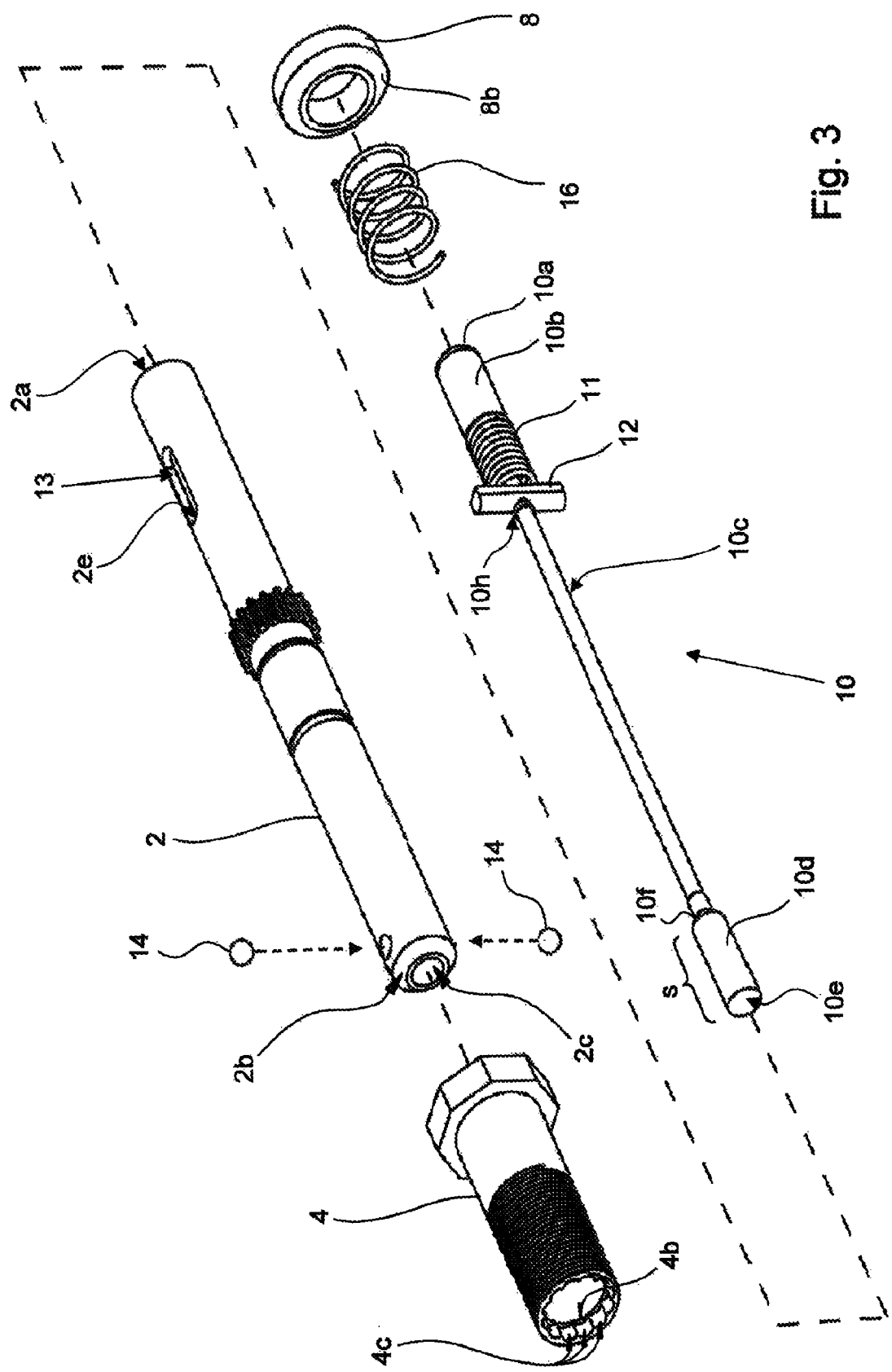
FIG. 3 depicts in perspective an exploded view of both the shaft through the hub, the rod supported concentrically within the shaft, and an adapter for fixing the shaft to a vehicle.
Figure 4:
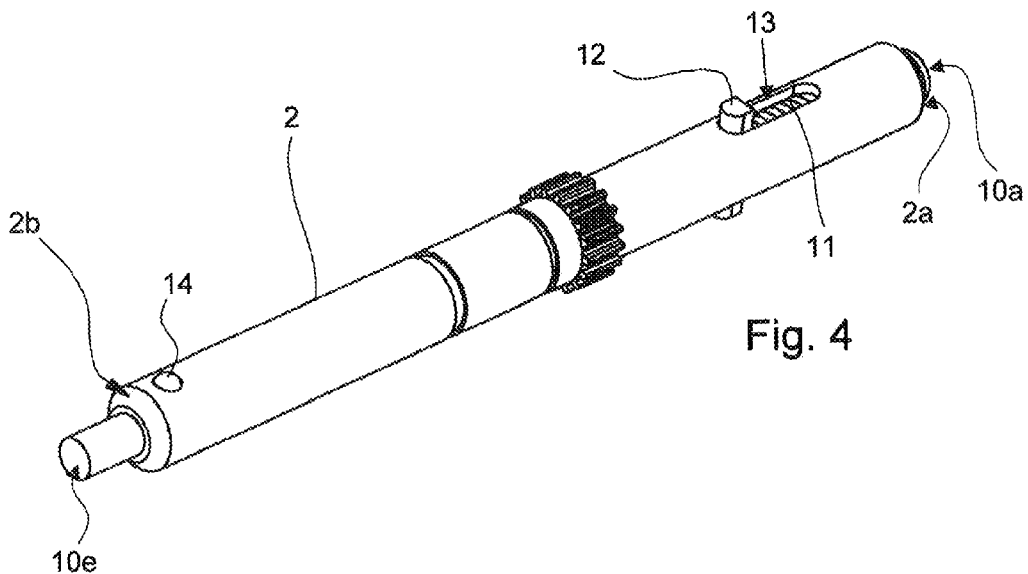
FIG. 4 depicts a perspective view of the hub shaft assembled together with the rod which runs along the concentric hole in the shaft and is used both for operating the quick lock and for setting the gear position.

FIG. 1 depicts an example of a hub 1 of a wheel with gearchanging by a gear shift. The hub is mounted on a shaft 2. The hub 1 according to the diagram comprises a planetary gear in the form of the elements which fill up the hub outside the shaft 2. As the function of a planetary gear is known, it will not be presented in detail here. The only part mentioned in, connection with the gear is its gear selector 3, i.e. the mechanical element which in the actual gear, in this example a planetary gear, causes the gear to be placed in a certain gear position. In the diagram, the protrusions 1a, 1b, 1c and 1d represent fixing flanges of the hub 1 for spokes of the wheel. The spokes may of course be replaced by all-covering wheel sides.

The shaft 2 is supported in a holder which is configured for the shaft and which in this case takes the form of an adapter 4. In this example, the adapter 4 is threaded outside on the side which is to be fixed to the vehicle, where the adapter can be screwed into an accommodating threaded hole.

The wheelshaft 2 runs through the hub 1 and within the planetary gear. The hub 1 is supported on the shaft 2 by ball bearings 6, 7, 8. The element round the shaft 2 and protruding to the right of the hub 1 in the diagram takes the form of a drive 9 to which the wheelchair's gripping ring is fastened. The drive 9 thus imparts driving force to the wheel. The purpose of the planetary gear is therefore to provide a suitable gear ratio between a driving force applied via the drive 9 and a counterforce from the running surface to the rotation of the wheel. The drive 9 is rotatable relative to the hub 1, owing to the fact that the drive 9 is supported by the ball bearing 7 relative to the hub 1 and by the ball bearing 8 relative to the shaft 2. The shaft 2 is suspended in the adapter 4.

The shaft 2 also serves as a quick lock for the wheel, i.e. the wheel with the hub 1 and the shaft 2 can by a simple hand movement be released from the adapter 4. The rod 10 is provided for this purpose. The rod 10 in this example is a rod with a circular cross-section which runs in a hole of circular cross-section through the centre of the shaft 2. The rod 10 is provided at its one end 10a with a head 10b which partly protrudes beyond a first end 2a of the shaft 2 and thereby serves as a knob which the user presses when the quick lock is to be disengaged in order to free the wheel. Inward from the head 10b the rod has a narrow portion 10c with a smaller diameter. A spring 11 is placed round this narrow portion 10c.

The spring 11 thus has its one end abutting against a shoulder of the head 10b of the rod 10. The other end of the spring 11 abuts against a shaft spigot 12 which extends in a radial direction outwards from the rod 10. The shaft spigot 12 extends transversely through a longitudinal hole 13 which extends in an axial direction along the shaft 2, in order to further penetrate the hub 1 and abut there against the gear selector 3. As the spring 11 abuts at its other end against the shaft spigot 12, the latter is pushed, together with the rod 10, towards the wheel suspension at the adapter 4. The rod 10 is thus constantly urged towards the inner end of the longitudinal hole 13 in the shaft 2. This arrangement results in the rod's first end 10a protruding in the form of the aforesaid knob from the shaft 2, at the latter's first end 2a. At the other end 10e of the rod 10, the inner end, the rod 10 broadens to form a circular cylindrical body 10d whose diameter is at least larger than that of the aforesaid narrow portion 10c. Said body 10d almost fills a circular cylindrical space 2c formed at the second end 2b of the shaft 2 and is movable axially in said space 2c. The diameter of the body 10d is therefore almost the same as the inside diameter of the space 2c. At the walls of said space 2c, the shaft 2 is provided with at least one hole 2d, each of which holes 2d accommodates a ball 14. When the rod 10 is in the locked position for the wheel, the body 10d will therefore close the hole 2d, thereby trapping the balls 14 in the hole 2d. Also, the diameter of the balls 14 is larger than the wall thickness of the space 2c in the shaft 2, which means that when the shaft 2 is in the locked position the balls 14 protrude outside the periphery of the shaft 2. Beyond the periphery of the shaft 2, the adapter 4 is concentric with the shaft 2. The adapter 4 is so arranged that at its inner end, which coincides with the position of the balls 14 and the hole 2d when the shaft is in a locked position, it has an internal circular rebate 4a in which the portion of the balls 14 which protrudes beyond the periphery of the shaft 2 can be accommodated. As the rebate 4a has outwards a shaped wall 4b, the balls 14 thereby block the possibility of the shaft 2 moving out of the adapter 4 when the rod 10 is in a position which locks the balls 14 in the hole 2d. By this arrangement the shaft 2 is locked and fixed to the adapter 4 and cannot move in an axial direction. As a specific detail, the rebate 4a is provided with repeated bowl-like indentations 4c adapted to the size of the balls 14, with the result that the shaft 2 is not only locked in the axial direction by the balls 14 but is also prevented from rotating.

By applying a pushing force to the first end 10a of the rod 10 which serves as the knob protruding from the shaft 2, e.g. by pressure of a finger, the spring force of the spring 11 can be overcome and the rod 10 can be pushed so that it moves inwards relative to the surrounding shaft 2. The body 10d will therefore move further out from the second end 2b of the shaft 2 on the opposite side. As previously mentioned, the body 10d on the rod 10 is of limited extent in the axial direction. In the locked position of the shaft 2, the body 10d extends from the rod's second end 10e to and actually past the cross-sectional plane where the hole 2d in the shaft 2 is situated. The body 10d also has a conical section 10f at the transition to the rod's narrower portion. When the rod 10 is thus pressed in, the rebate 4a with the bowl-like indentations will exert a pushing force on the balls 14. As the rod simultaneously narrows at the conical section 10f, the balls 14 will be pushed inwards radially and can be accommodated in the space 15 formed between the rod's narrower portion and the shaft 2. The result will be that the balls 14 no longer lock the shaft 2 by abutting against the wall 4b of the adapter 4, which means that the wheel with the hub and shaft can be drawn out from the adapter 4, the wheel only being unlocked and entirely freed from the vehicle by pushing in the rod 10.

Locking the wheel to the adapter 4 proceeds correspondingly in the opposite order. Keeping the rod 10 pressed in and introducing the shaft 2 into the adapter 4 will cause the outer wall of the space 15 to push the balls 14 out radially so that they enter the holes 2d and are trapped therein when the pushing force on the rod's first end ceases and the rod 10 springs back outwards. The thicker portion of the rod 10, i.e. the body 10d, will then close the holes 2d and trap the balls there, resulting in the shaft 2 being once again locked to the adapter 4, as described above.

Figure 5A:
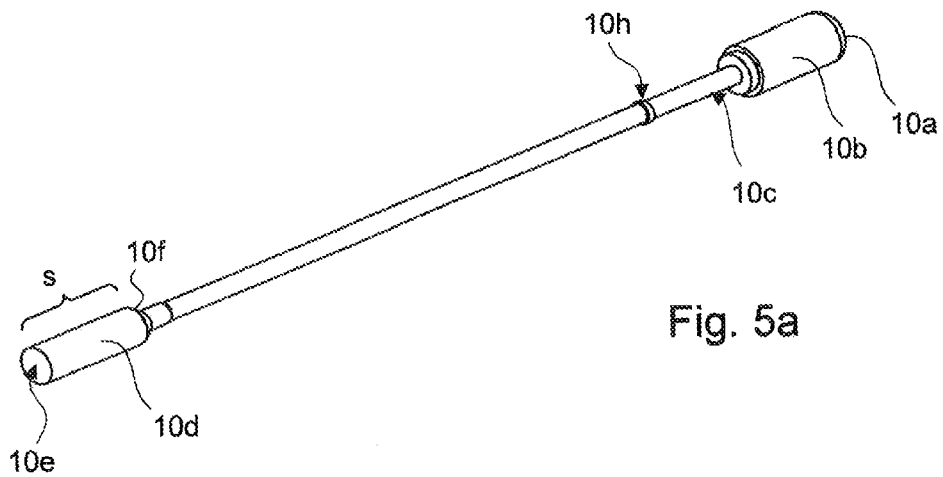
Figure 5B:
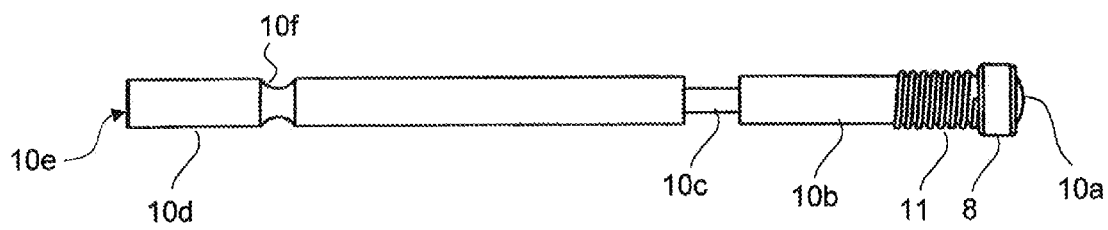
FIG. 5b depicts an alternative rod illustrated with a counterpressure spring.

As previously mentioned, there is also a shaft spigot 12 which is in contact with the rod 10. The shaft spigot 12 may be configured in several different ways. As a first alternative, the shaft spigot 12 takes the form of a pin which is partly movable relative to the rod 10 and extends radially outwards from the rod approximately equally far in diametrically opposite directions through the previously described hole 13 in the shaft 2. According to another alternative, the shaft spigot 12 is integrated with the gear selector 3 in the hub, in which case the shaft spigot 12 extends through the hole 13 and engages in the narrow portion 10c, which in that case takes the form of a circumferential groove on the rod 10, so that the shaft spigot will move in an axial direction if the rod 10 moves in either axial direction, see FIG. 5b. With this configuration it is possible for the rod 10 to be moved outwards within the shaft 2 and for the same rod 10 as is used for locking/unlocking the wheel to/from the vehicle to be used for moving the gear selector 3 in the hub 1 to a desired position, thereby making it possible to obtain a desired gear ratio between the drive 9 and the hub 1 with the relating wheel.

The shaft spigot 12 abuts a first stop 10h on the rod 10 and is urged against the first stop by the spring force from the spring 11. The shaft spigot can also run freely on the rod 10 between the spring 11 and said first stop 10h. The shaft spigot also has a second stop 2e constituted by the inner end of said longitudinal hole 13 in the shaft 2. In response to release by the quick lock when the rod 10 is pushed inwards (i.e. towards the left in FIG. 1), the shaft spigot 12 will remain stationary in its position and run relative to the rod 10, being held in position by the second stop 2e on the shaft 2, which does not move. In response to outward movement of the rod 10 (i.e. towards the right in FIG. 1) for choice of gear position, however, the shaft spigot 12 will accompany the rod's movement, as the rod's first stop 10h carries the shaft spigot 12 with it.

A substantial element of the invention is the extended body 10d on the rod 10, the length s of which causes the locking of the shaft 2 by the quick lock described to continue so long as any portion of the extent s of the body 10d during the rod's movement in an axial direction covers the holes 2d in the shaft 2. As a result of this arrangement, the rod 10 can move axially outwards (and some steps inwards from its outermost position) without the balls 14 having any possibility of moving radially towards the centre of the shaft and unlocking it. The possibility of choosing the gear position is illustrated in FIG. 1, in which the outermost edge of the circular cylindrical body 10d is represented by a broken line marked 10g. When the rod 10 is in an axial position, such as the line 10g, coincides with position A in the diagram, the planetary gear is placed in a first gear position by means of the shaft spigot 12, which positions the gear selector according to the shaft spigot's position in the axial direction. If instead the rod 10 is pushed into the hub 1 so that said line 10g coincides with position B in the diagram, the gear is placed in a second gear position. Similarly, when the rod is so placed that said line 10g coincides position C, the gear is placed in a third gear position. These said outward axial movements of the rod 10 have to overcome a spring force, since a second spring 16 exerts a counterpressure to the gearchange movements effected by the rod 10. The spring 16 is fitted concentrically about the rod 10 at the latter's head 10b and is clamped between the rod 10 and a further part, in this example a third stop 8b, which at the same time constitutes a bearing race for the ball bearing 8 via which the drive 9 is supported on the shaft 2. The spring 16 thus endeavours by its spring force to push the rod back to the first gearchange position. The body 10d which extends inwards from the line 10g, i.e. towards the second end of the rod, is of uniform thickness, i.e. its radius is unchanged for a distance at least corresponding to the maximum possible outward movement of the rod 10. As a result of this arrangement, the locking of the wheel to the adapter 4 will, as previously mentioned, not be affected by outward movements of the rod 10 in the axial direction during the setting of the various gear positions by the rod 10 as the imparter of the gear position selected.

The gear shift also comprises a control for operating the rod 10 in order to impart a selected gear position. According to one embodiment, the control takes the form of a wire 17 connected to an undepicted gear positioner disposed at a location convenient to the user. According to this embodiment, a lever 18 is disposed at the end of the control which acts upon the rod 10. The lever is provided with an eccentric 19. In a normal position arranged for the gear, the eccentric 19 on the lever 18 does not abut against the rod 10. The spring force of the previously mentioned spring 16 therefore holds the gear stationary in the first gearchange position, here called the normal position. In response to switching of the gear positioner for selection of a second gear position, with consequent pulling of the wire 17, the lever 18 pivots, with the result that the eccentric 19 pushes the rod 10 in and thereby causes the rod 10, the shaft spigot 12 and the gear selector 3 to set the second gear position in the gear. In a corresponding manner a third gear position may be set by further pulling of the wire 17 by the gear positioner. Reversion from the third gear position to the second gear position or from the second to the first results in the gear positioner being placed according to the setting, after which the spring force from the spring 16 causes the rod 10 to return automatically as far as is allowed by the eccentric 19. More than three gear positions may of course be provided if the mechanical components are modified accordingly. Here it may also be mentioned that the control may be arranged in alternative ways. For example, the wire 17 may be replaced by a link mechanism. A push control may be provided instead of a pull control, in which case the lever 18 will be modified accordingly.

Where the gear shift according to the invention is used on a wheelchair, it is advantageous that both of the wheelchair's wheels be subjected to approximately simultaneous gearchanging and that the same gear ratio be set for both wheels. Achieving this entails providing a gear shift according to the invention on each of the wheelchair's wheels, with a single gear positioner according to the examples being preferably provided to effect the gearchanging of both wheels. This may for example be achieved by the wire 17 used in the control for each gear shift being operated by the same gear positioner.

DEFINITIONS

The direction called inwards or inner means the direction as seen from the outside of the wheel when looking in towards the vehicle or, more clearly, in towards the wheel suspension.

The direction outwards or outer means the direction towards the side of the wheel where the quick lock's operating knob is situated.

The invention claimed is:

1. A gear shift pertaining to a hub of a wheel with a quick locking function, where the hub comprises a gear supported round a shaft which has a first end and a second end, wherein the second end of said shaft is adapted to being suspended relative to a suspension device on a vehicle, and where the quick lock function comprises a rod running in a cylindrical hole which is concentric within and with the shaft, and a catch which locks the wheel and the shaft to the suspension device, wherein the gear shift comprises the shaft, the rod and a control, where:

said rod has a neutral position relative to the shaft, a movement from the neutral position of the rod, relative to the shaft, from the shaft's first end towards a second end of the shaft disconnects the lock, making it possible for the wheel together with the shaft to be locked to and released from the suspension device respectively, the rod comprises a gear selector contact configured to contact a gear selector in the gear a movement, relative to the shaft, of the rod in an axial direction from the neutral position in a direction away from the second end of the shaft towards the first end of the shaft causes, via the gear selector contact, the gear selector in the gear to change gear position so that the gear ratio of the wheel relative to a drive device for the wheel is changed.

2. The gear shift according to claim 1, wherein said gear comprises a planetary gear.

3. The gear shift according to claim 1, wherein said gear selector contact comprises a transverse shaft spigot extending radially outwards from the rod transversely through a longitudinal hole extending in an axial direction along the shaft.

4. The gear shift according to claim 1, wherein
said rod has a first rod end which protrudes from the first end of the shaft on one side of the hub, whereby said first rod end responds to pressing in of the shaft by operating said catch for locking/release and
said rod has a second rod end which protrudes from the second end of the shaft on another side of the hub, whereby said second rod end responds to pressing in of the shaft by effecting said change of gear position.

5. The gear shift according to claim 1, wherein said suspension device takes the form of an adapter fixed to a vehicle and wherein the adapter is designed to support and accommodate the shaft.

6. The gear shift according to claim 5, wherein said catch comprises:
at the second end of the shaft at least one through-hole formed in the wall of the shaft,
a circular rebate formed inside the adapter, and
a ball which responds to catch activation by moving into both said through-hole and said rebate, with the result that the shaft cannot move out from the adapter.

7. The gear shift according to claim 6, wherein the adapter has in the circular rebate bowl-like indentations matching the size of the balls, with the result that the shaft is not only locked in an axial direction by the balls but is also prevented from rotating relative to the adapter.

8. The gear shift according to claim 1, wherein the rod is held in a neutral position by a spring which urges the rod inwards to maintain said neutral position so long as an external pressing force is not applied to the rod in order to compress said spring, whereby the gear assumes a first gear position when the rod is in said neutral position.

9. The gear shift according to claim 8, wherein the rod, when the rod responds to a pressing force by compressing the spring and thereby moving a first distance axially outwards, acts via the gear selector contact to cause the gear selector in the gear to change gear position to a second gear position.

10. The gear shift according to claim 9, wherein the rod, when the rod moves outwards beyond said first distance, acts via the gear selector contact to cause the gear selector to change gear position to a gear position of a higher order than the second gear position.

11. The gear shift according to claim 1, wherein the control comprises a pull or push device which causes a pressure device to exert an outward force on rod at its second end so that the rod is subjected to said axial movement.

12. The gear shift according to claim 11, wherein the pressure device comprises a lever with an eccentric mounted on the lever.

13. The gear shift according to claim 11, wherein the pull device comprises a wire.

14. The gear shift according to claim 1, wherein the rod comprises an elongate body which prevents release of the catch during the setting of various gear positions.

15. A method for changing the gear ratio between a drive device and a wheel of a vehicle, wherein the wheel has a hub with a quick locking function and wherein the hub comprises a gear supported round a shaft which has a first end and a second end, whereby the second end of said shaft is adapted to being suspended relative to a suspension device on the vehicle, and wherein the quick locking function comprises a rod which runs in cylindrical hole which is concentric within and with the shaft, and a catch which locks the wheel and the shaft to the suspension device, wherein the gear shift comprises the shaft, the rod and a control, comprises:

maintaining the rod in a neutral position in which the gear assumes a first gear position, and shifting the gear in the hub to a second gear position by pushing an inner end of the rod a predetermined distance in an outward axial direction.

16. The method according to claim 15, further comprising:
releasing said catch by pressing the outer end of the rod in an inward axial direction, whereby the wheel with the hub and the shaft can be released from/applied to the suspension device.

17. The method according to claim 15, further comprising:
effecting a selection of a gear position utilizing a positioner so situated as to be readily accessible to a user of the vehicle, and
imparting the positioner, via the control, movements of the rod in an axial direction for desired gear position setting.

18. A wheelchair, comprising:
two wheels, and
a gear shift pertaining to a hub of a wheel with a quick locking function, where the hub comprises a gear supported round a shaft which has a first end and a second end, wherein the second end of said shaft is adapted to being suspended relative to a suspension device on a vehicle, and where the quick lock function comprises a rod running in a cylindrical hole which is concentric within and with the shaft, and a catch which locks the wheel and the shaft to the suspension device, wherein the gear shift comprises the shaft, the rod and a control, wherein said rod has a neutral position relative to the shaft, a movement from the neutral position of the rod, relative to the shaft, from the first end of the shaft towards a second end of the shaft disconnects the lock, making it possible for the wheel together with the shaft to be locked to and released from the suspension device respectively, the rod comprises a gear selector contact configured to contact a gear selector in the gear, a movement, relative to the shaft, of the rod in an axial direction from the neutral position in a direction away from the second end of the shaft towards the first end of the shaft causes, via the gear selector contact, the gear selector in the gear to change gear position so that the gear ratio of the wheel relative to a drive device for the wheel is changed.

19. The wheelchair according to claim 18, wherein each wheel is provided with said gear shift and where a positioner for gear position pertaining to one wheel operates both of the gear shifts.

* * * * *